(12) United States Patent
Shiota

(10) Patent No.: US 12,501,146 B2
(45) Date of Patent: Dec. 16, 2025

(54) IMAGE PROCESSING APPARATUS, IMAGE CAPTURING APPARATUS, CONTROL METHOD OF IMAGE PROCESSING APPARATUS, AND STORAGE MEDIUM

(71) Applicant: CANON KABUSHIKI KAISHA, Tokyo (JP)

(72) Inventor: Ryo Shiota, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 18/515,614

(22) Filed: Nov. 21, 2023

(65) Prior Publication Data

US 2024/0187727 A1    Jun. 6, 2024

(30) Foreign Application Priority Data

Dec. 2, 2022    (JP) ................................ 2022-193344

(51) Int. Cl.
*H04N 23/63* (2023.01)
*H04N 23/68* (2023.01)
*H04N 23/73* (2023.01)

(52) U.S. Cl.
CPC ....... *H04N 23/632* (2023.01); *H04N 23/6811* (2023.01); *H04N 23/6845* (2023.01); *H04N 23/73* (2023.01)

(58) Field of Classification Search
None
See application file for complete search history.

(56) References Cited

U.S. PATENT DOCUMENTS

| | | | |
|---|---|---|---|
| 2012/0274830 A1* | 11/2012 | Kameyama | H04N 25/58 348/E5.037 |
| 2021/0329184 A1* | 10/2021 | Watanabe | H04N 25/671 |

FOREIGN PATENT DOCUMENTS

| | | | | |
|---|---|---|---|---|
| CN | 103888683 B | * | 5/2015 | H04N 5/2257 |
| CN | 104159040 B | * | 7/2019 | H04N 5/232 |

(Continued)

OTHER PUBLICATIONS

English translation of JP-6278713-B2, Iwasaki, 2018 (Year: 2018).*

(Continued)

*Primary Examiner* — James M Hannett
(74) *Attorney, Agent, or Firm* — Cowan, Liebowitz & Latman, P.C.

(57) ABSTRACT

An image processing apparatus includes a control unit setting an exposure of an image to be captured, setting a quantity of images to be captured, and acquiring a plurality of image signals corresponding to the set quantity by controlling image capturing at the set exposure; a composing unit generating an additive composite image by additively composing the plurality of image signals; a live view image generating unit generating an image for live view; and a live view image display unit controlling a display unit to display the image for live view. The image for live view is an image displayed in real time before the control unit executes image capturing. The live view image generating unit generates simulation images corresponding to an exposure of the additive composite image as images for live view in accordance with the exposure and the quantity which are set.

11 Claims, 5 Drawing Sheets

(56) References Cited

FOREIGN PATENT DOCUMENTS

JP        2006-054698 A     2/2006
JP        6278713 B2 *     2/2018   .......... H04N 5/2352

OTHER PUBLICATIONS

English translation of CN-104159040-B, Li, 2019 (Year: 2019).*
English translation of, CN-103888683-B, Jiang, 2015 (Year: 2015).*

* cited by examiner

IMAGE PROCESSING APPARATUS, IMAGE CAPTURING APPARATUS, CONTROL METHOD OF IMAGE PROCESSING APPARATUS, AND STORAGE MEDIUM

BACKGROUND

Field

The present disclosure relates to an image processing apparatus and an image capturing apparatus capable of composing a plurality of images.

Description of the Related Art

It is generally known that an image blur occurs due to a shake of an image capturing apparatus, such as a camera shake when photographing is performed at a long-second exposure. In order to correct an image blur, Japanese Patent Laid-Open No. 2006-54698 discloses an image capturing apparatus that captures images by performing exposure while dividing a total exposure time, and curbing occurrence of an image blur by additively composing images.

However, in the image capturing apparatus of Japanese Patent Laid-Open No. 2006-54698, in the case of using display of images at divided exposure times for live view display before photographing, it is difficult for a user to imagine which exposure an image after additive composition will be subjected to. For this reason, it is difficult for a user to judge how the exposure (for example, the shutter speed, the aperture, the ISO sensitivity, and the like) should be set and the quantity of capturing images on the basis of the live view display.

SUMMARY

The present disclosure provides an image processing apparatus that displays an image at an exposure after additive composition of a plurality of images is live-view displayed.

An image processing apparatus of the disclosure includes an exposure setting unit setting an exposure of an image to be captured, a quantity setting unit setting a quantity of images to be captured, an image capturing unit acquiring a plurality of image signals corresponding to the set quantity by controlling image capturing at the set exposure, a composing unit generating an additive composite image by additively composing the plurality of image signals, a generating unit generating an image for live view, and a display control unit controlling a display unit to display the image for live view. The image for live view is an image displayed in real time before the image capturing unit executes image capturing. The generating unit generates simulation images corresponding to an exposure of the additive composite image as images for live view in accordance with the exposure and the quantity.

Further features of the present disclosure will become apparent from the following description of exemplary embodiments with reference to the attached drawings.

DESCRIPTION OF THE EMBODIMENTS

First Embodiment

Figure 1:
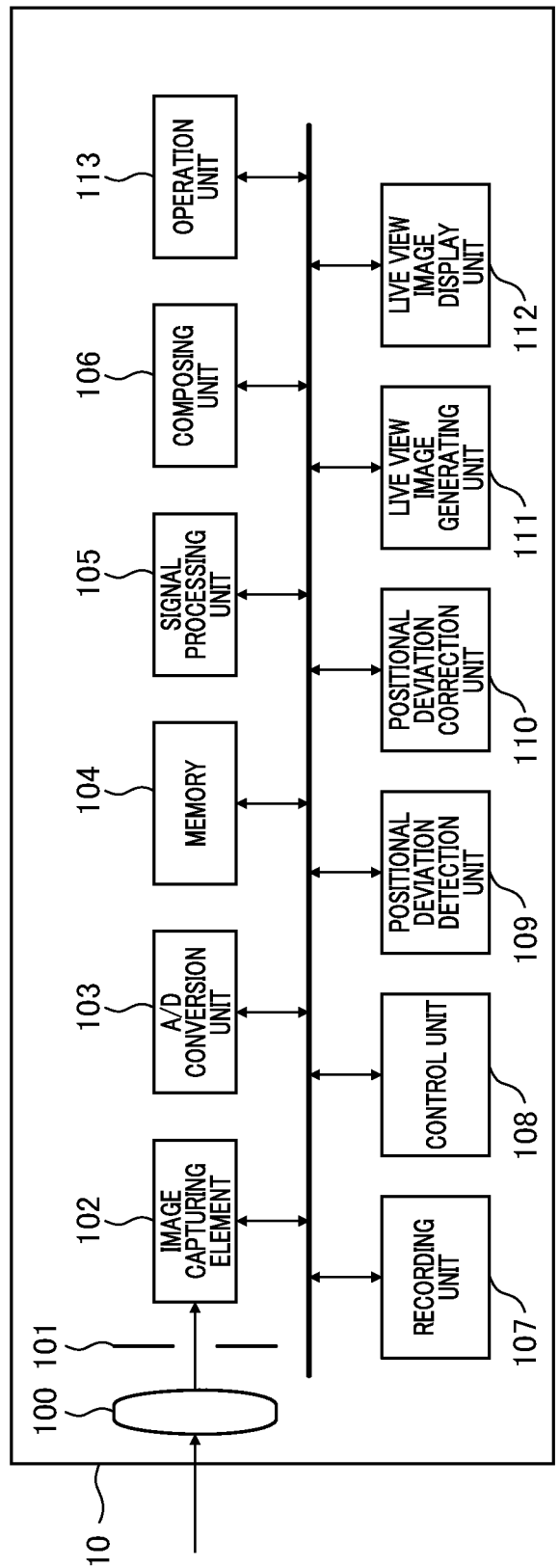
FIG. 1 is a view showing a constitution of an image capturing apparatus.

FIG. 1 is a view showing a constitution of an image capturing apparatus. For example, an image capturing apparatus 10 has an image capturing optical system, an image capturing element 102, an A/D conversion unit 103, an image processing apparatus, a recording unit 107, a live view image display unit 112, and an operation unit 113. The image processing apparatus includes a processor such as a central processing unit (CPU), and a memory for recording programs executed by the processor. The image capturing optical system has a photographing lens 100 and an aperture 101. The image processing apparatus has a memory 104, a signal processing unit 105, a composing unit 106, a control unit 108, a positional deviation detection unit 109, a positional deviation correction unit 110, and a live view image generating unit 111. In the present embodiment, an example of an image capturing apparatus in which a main body portion of the image capturing apparatus and a lens device constituting the image capturing optical system are integrated will be described, but an image capturing apparatus in which a lens device can be detachably attached to a main body portion may be adopted.

The photographing lens 100 includes a plurality of lenses such as a focus lens and a shift lens. The aperture 101 adjusts the amount of light passing through the image capturing optical system. If a shutter switch SW2 of the operation unit 113 is pressed down, light rays incident on the photographing lens 100 pass through the aperture 101 and form a subject image in the image capturing element 102. The image capturing element 102 converts an optical image of the subject image into an image signal that is an electrical signal (analog signal) and outputs it. The image capturing element 102 has a photoelectric conversion element having a constitution of a Bayer array in which pixels of R, G1, G2, and B are regularly disposed, for example. An analog signal output from the image capturing element 102 is converted into an image signal that is a digital signal (RAW data) by the A/D conversion unit 103 and is saved temporarily in the memory 104. In addition, a digital signal converted by the A/D conversion unit 103 may be output to the signal processing unit 105, and image processing may be performed in the signal processing unit 105. The signal processing unit 105 performs development processing such as color matrix processing or gamma processing with respect to the RAW data or the RAW data composed by the composing unit 106. In addition, the signal processing unit 105 may perform various kinds of image processing such as noise removal, demosaicing, luminance signal conversion, aberration correction, white balance adjustment, and color correction. The memory 104 saves the RAW data, image data processed by the signal processing unit 105, and the like.

The composing unit 106 composes a plurality of images. In the present embodiment, the composing unit 106 performs computation processing of additive composition of the RAW data and generates a composite image. When the luminance value of each image before composition is I_i(x, y) (i=1 to N, and x,y expresses coordinates within a screen), and when the luminance value of an image after composition of the N images is I(x,y), the luminance value I(x,y) of the image after composition is expressed by the following Expression 1.

$$I(x,y)=I\_1(x,y)+I\_2(x,y)+ \text{ and so on to } +I\_N(x,y) \quad \text{(Expression 1)}$$

That is, a result of addition processing of the luminance values of N images for each pixel becomes composite image data.

The recording unit 107 records the RAW data output by the A/D conversion unit 103, the RAW data composed by the composing unit 106, the image data subjected to development processing by the signal processing unit 105, and the like. The recording unit 107 may record the image data and the like in an external memory which is detachably attached to the image capturing apparatus 10 and may record them in an external device such as a smartphone connected to the image capturing device 10. The control unit 108 performs general control of the image capturing apparatus 10. For example, the control unit 108 also functions as an exposure setting unit setting an exposure such as a shutter speed, an aperture, and an ISO sensitivity, and a quantity setting unit setting the quantity of capturing images. In addition, the control unit 108 functions as an image capturing unit controlling image capturing by controlling the image capturing element 102. In addition, the control unit 108 also functions as a subject detection unit detecting a subject and determining whether or not the subject is a moving body.

The positional deviation detection unit 109 detects the amount of positional deviation in pixel units between images which have been continuously photographed. In the present embodiment, the positional deviation detection unit 109 detects the amount of deviation in pixel units by performing template matching with respect to a reference image and a positioning image. Template matching is a technique in which particular regions of an image are cut out, the absolute value of the difference between the particular regions is measured while shifting the template position, and the amount of deviation with the smallest difference is set as the amount of positional deviation. In the present embodiment, the amount of positional deviation is detected by performing template matching of an image, but the embodiment is not limited to this. For example, the positional deviation detection unit 109 may acquire angles of rotation of a camera during continuous photographing with a gyro sensor and may calculate the amount of positional deviation between images from focal distances and the angles of rotation. The positional deviation correction unit 110 performs affine conversion of the position of the RAW data and outputs it to the memory 104 based on the amount of positional deviation for each pixel detected by the positional deviation detection unit 109.

The live view image generating unit 111 performs development processing of the RAW data captured for live view and performs display through the live view image display unit 112 disposed on the rear surface or the like of the image capturing apparatus 10. The live view image display unit 112 functions as a display control unit controlling display of a live view image generated by the live view image generating unit 111. For example, the live view image display unit 112 displays a live view image in a display that is a display unit disposed on the rear surface or the like of the image capturing apparatus 10. The display unit may be a touch panel which can receive an operation of a user. A GUI can be constituted as if a user could directly operate the screen displayed in the touch panel by associating input coordinates and display coordinates in the touch panel with each other. In addition, when the image capturing apparatus 10 is connected to an external device having a display, such as a PC or a smartphone (not shown), the live view image display unit 112 can also display a live view image in a display of the external device. The operation unit 113 receives an operation from a user and sets the exposure of image capturing, the quantity of capturing images, and the like in accordance with the operation. The operation unit 113 receives an operation of a user from various kinds of buttons and the touch panel provided in the image capturing apparatus 10, the external device connected to the image capturing apparatus 10, and the like. In addition, the operation unit 113 may receive an instruction from a user through an audio input.

Figure 2:
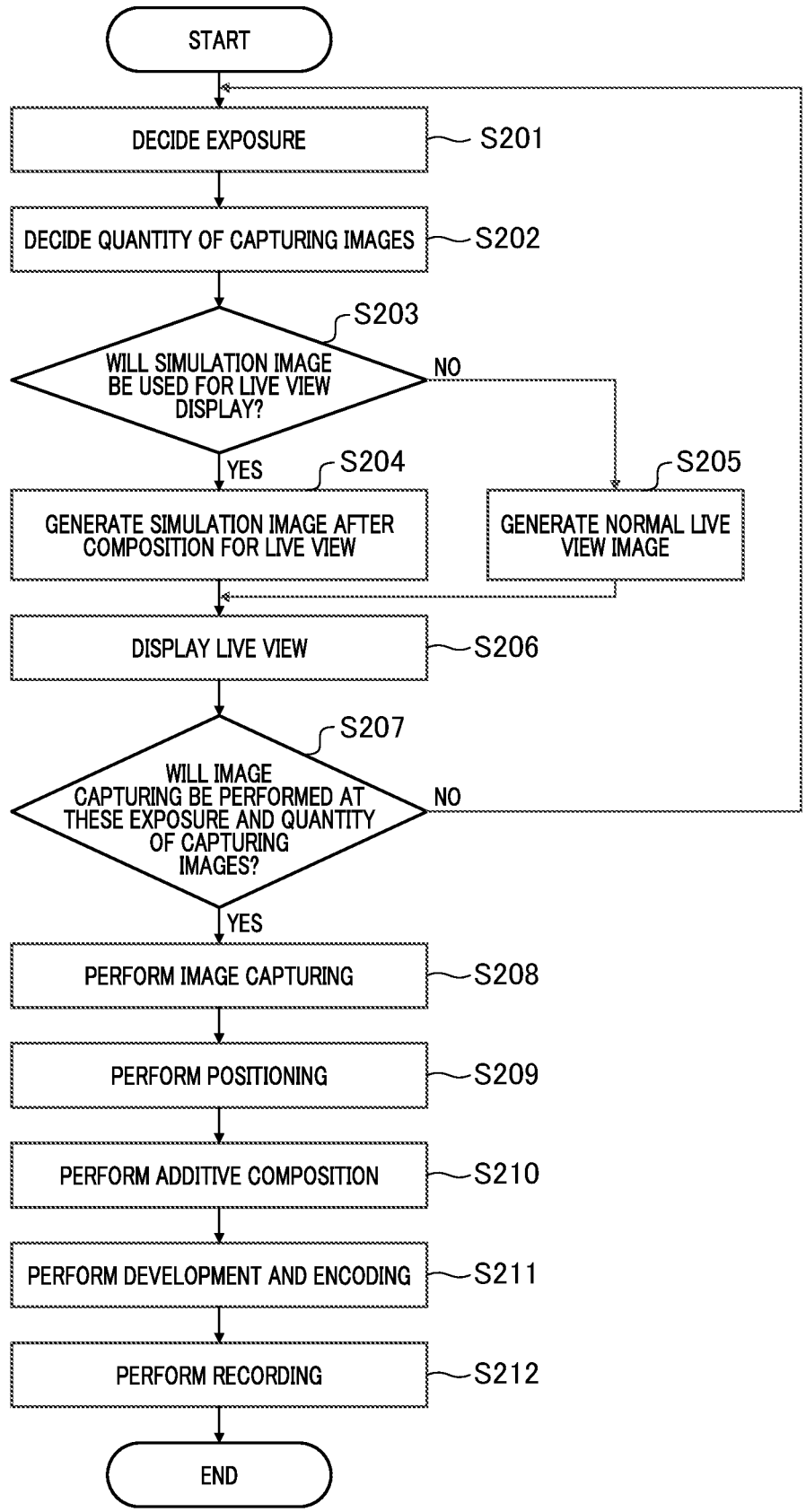
FIG. 2 is a flowchart showing photographing processing according to First Embodiment.

FIG. 2 is a flowchart showing photographing processing according to the present embodiment. The photographing processing shown in FIG. 2 is photographing processing executed in an additive composition mode. The additive composition mode is a mode in which images are captured by performing exposure while dividing the total exposure time and an additive composite image is generated by detecting and correcting the positional deviation of each image. Each step of processing shown in FIG. 2 is realized by the processor reading and executing a program from the memory. In the present embodiment, before image capturing of an image for additive composition is executed, a live view image can be displayed in real time and a user can change the setting while viewing the live view image.

When the additive composition mode is designated by an operation of a user, this processing starts. In S201, the control unit 108 decides the exposure. The exposure decided in S201 is an exposure of each of a plurality of images captured for additive composition. Specifically, the shutter speed, the aperture, and the ISO sensitivity are set. The values of the setting may be manually designated by a user or may be decided by automatic exposure control of the image capturing apparatus 10 (automatic exposure computation functions such as program AE, shutter speed priority, and aperture priority). In S202, the control unit 108 decides the quantity of capturing images for performing additive composition. A numeral of 2 or larger is set for the quantity of capturing images. The quantity of capturing images may be designated by a user or may be automatically judged by the image capturing apparatus 10. In the present embodiment, an example in which the exposure of an image before additive composition is decided has been described, but the total exposure after additive composition may be set. The exposures of a plurality of images to be captured for additive composition can be decided by setting the total exposure after additive composition and the quantity of photographing.

In S203, the control unit 108 determines whether to use a simulation image for live view display. Here, a simulation image is an image of which the exposure after additive composition can be confirmed. That is, in the step, a simulation image is an image corresponding to the exposure after additive composition decided in accordance with the exposure and the quantity of photographing set in S201 and S202. For example, a simulation image is generated by increasing the gain of the image for live view. Whether or not to use a simulation image for live view display may be designated by a user using the menu or the buttons of the camera or may be automatically judged by the image capturing apparatus 10 through processing. If it is judged by the image capturing apparatus 10, for example, it is judged that no simulation image is used when a moving object is detected within the angle of view and that a simulation image is used when a still object is photographed. Judgment is made differently depending on the presence or absence of a moving object because a simulation image in a case of having a moving object will become multiple images so that the simulation result will not be correct. When it is determined to use a simulation image in S203, the processing of S204 is executed, and when it is determined to use no simulation image, the processing of S205 is executed.

In S204, the live view image generating unit 111 generates a simulation image for live view. In the step, the live view image generating unit 111 generates a simulation image matching the exposure after additive composition in accordance with the exposure and the quantity of photographing set in S201 and S202. First, the live view image generating unit 111 obtains the number of stages which become bright through additive composition using the quantity of photographing. When the quantity of addition is N, the number n of stages which become bright is expressed by the following Expression 2.

$$n = \log_2 N \quad \text{(Expression 2)}$$

The live view image generating unit 111 generates simulation images corresponding to the exposure after additive composition using the number n of stages which become bright. For example, the live view image generating unit 111 generates simulation images corresponding to the exposure after additive composition using a development method in which the RAW for live view is made n stages brighter by increasing the gain. In the present embodiment, a method of generating a simulation image by increasing the gain has been described, but the method of generating a simulation image is not limited to this. For example, a simulation image corresponding to the exposure after additive composition may be generated using a development method in which photographing setting of the RAW for live view is raised by gamma and image capturing is performed brighter by n stages. In addition, when an image for live view is captured, a simulation image may be generated through exposure correction in which setting of at least any of the shutter speed, the aperture, and the ISO sensitivity is changed and the exposure is made brighter by n stages.

In S205, the live view image generating unit 111 generates a normal live view image. Here, normal live view indicates that an image photographed at the exposure set in S201 is displayed. In S205, the live view image generating unit 111 performs development according to the set exposure instead of special development as in S204. In S206, the live view image display unit 112 controls display of a live view image generated in S204 or S205. For example, the live view image display unit 112 displays a live view image in the display provided on the rear surface of the image capturing apparatus 10.

In S207, the operation unit 113 receives judgment of a user as to whether to capture an image using the exposure and the quantity of capturing images decided in S201 and S202, and the result is sent to the control unit 108. The user confirms the live view image displayed in S206, judges whether to capture an image using the exposure and the quantity of capturing images decided in S201 and S202, and instructs the image capturing apparatus 10 regarding the judgment result. When the user is satisfied with the image displayed in S206, or the like, an instruction to perform image capturing using the exposure and the quantity of capturing images decided in S201 and S202 is sent to the image capturing apparatus 10. On the other hand, when the user cannot be satisfied with the image displayed in S206, or the like, an instruction not to perform image capturing using the exposure and the quantity of capturing images decided in S201 and S202, that is, an instruction to change the exposure is sent to the image capturing apparatus 10. When an image is captured using the exposure and the quantity of capturing images decided in S201 and S202, the processing of S208 is performed. On the other hand, when no image is captured using the exposure and the quantity of capturing images decided in S201 and S202, the processing returns to S201, the exposure or the quantity of capturing images is changed again, a live view image corresponding to the setting after change is generated and displayed, and setting change is repeated until the user satisfies.

In S208, if the operation unit 113 detects that a user has pressed down the shutter switch SW2, the control unit 108 captures an image at the exposure and the quantity of capturing images decided by controlling the image capturing element 102 and generates the RAW data. That is, the control unit 108 captures an image as many as the quantity of photographing set in S202 at the exposure decided in S201, acquires a plurality of image signals corresponding to the quantity of capturing images, and generates the RAW data. In S209, the positional deviation detection unit 109 and the positional deviation correction unit 110 perform positioning for the RAW data obtained in S208 using the first image as a reference. Regarding the RAW data other than the first image, the positional deviation detection unit 109 detects the amount of deviation with respect to the RAW data of the first image using a template matching technology or a gyro sensor, and the positional deviation correction unit 110 performs geometric deformation or the like of the RAW data using affine conversion.

In S210 and S211, an additive composite image is generated by additively composing a plurality of image signals subjected to image capturing S208. In S210, the composing unit 106 additively composes the RAW data subjected to positioning in S209. Expression 1 expresses the method of additive composition. In S211, the signal processing unit 105 performs development and encoding with respect to the RAW data subjected to additive composition in S210. In S212, the recording unit 107 records the file subjected to development and encoding in S211. Specifically, the recording unit 107 performs recording in a recording medium (not shown) inserted into the image capturing apparatus 10 or recording in an external medium such as a PC or a smartphone.

As described above, according to the present embodiment, a simulation image corresponding to the exposure after additive composition can be live-view displayed before image capturing. By confirming the simulation image, a user can imagine how the exposure will be after additive composition, which will assist the user in setting of the exposure or in setting of the quantity of capturing images, and thus it is easy for the user to generate a desired composite image.

Second Embodiment

In First Embodiment, an example in which a simulation image is displayed without any change has been described, but in the present embodiment, an example in which a part of a region is emphasis-displayed will be described. In the present embodiment, an example in which a halation region is emphasis-displayed will be described, but the embodiment is not limited to this. For example, a blackened region may be emphasis-displayed, or both a halation region and a blackened region may be emphasis-displayed by different emphasis methods.

Figure 3:
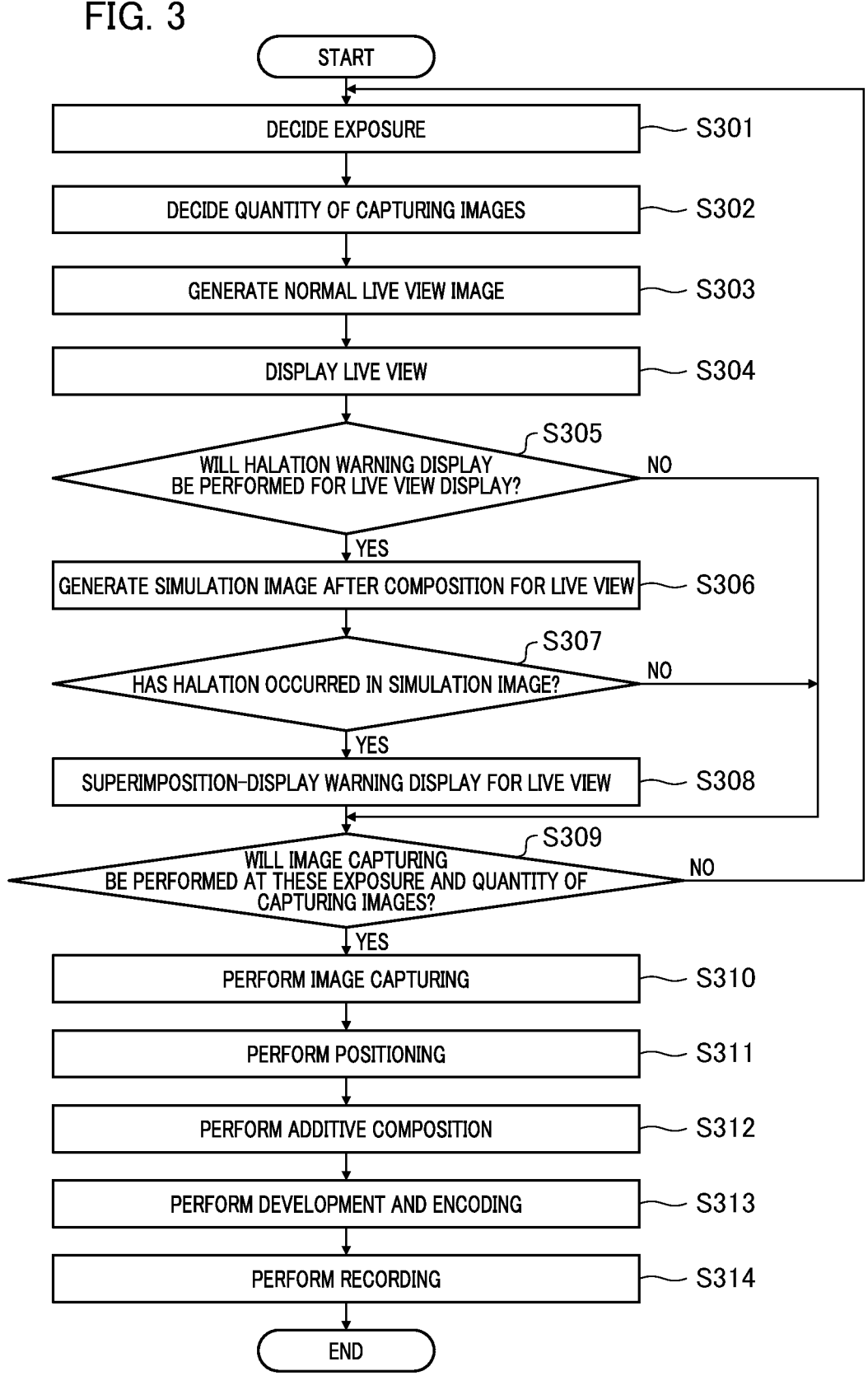
FIG. 3 is a flowchart showing photographing processing according to Second and Third Embodiments.

FIG. 3 is a flowchart showing image processing according to Second Embodiment and Third Embodiment. The photographing processing Shown in FIG. 3 is photographing processing executed in the additive composition mode. Each step of the processing Shown in FIG. 3 is realized by the processor reading and executing a program from the memory. In Second Embodiment, only the points different from First Embodiment will be described, and the same reference signs will be applied to the same constitutions and description thereof will be omitted.

This processing starts when the additive composition mode is designated by an operation of a user. Each of S301 and S302 is the same as the processing of S201 and S202 in First Embodiment. When the processing of S202 is completed, the processing of S303 is executed. In S303, the live view image generating unit 111 generates a normal live view image. The processing of S303 is the same as the processing of S205 in First Embodiment. When the processing of S303 is completed, the processing of S304 is executed. In S304, the live view image display unit 112 performs control of displaying the live view image generated in S303. That is, in S304, the normal live view image is displayed. When the processing of S304 is completed, the processing of S305 is executed.

In S305, the live view image generating unit 111 judges whether to perform halation warning display for live view display. Whether to perform halation warning display is set by a user, and the live view image generating unit 111 determines in accordance with the setting by the user. When it is set to perform halation warning display, the processing of S306 is performed. On the other hand, When it is set not to perform halation warning display, the processing shifts to S309.

In S306, the live view image generating unit 111 generates a simulation image for live view. The processing of S306 is the same as the processing of S204 in First Embodiment. In S307, the live view image generating unit 111 judges whether a halation region is present in the simulation image generated in S306. The live view image generating unit 111 judges whether a halation region is present by confirming whether the luminance value has reached a halation threshold for each pixel in the simulation image. When a halation region is present in the simulation image, the processing of S308 is executed. On the other hand, when no halation region is present in the simulation image, the processing of S309 is executed.

Figure 4:
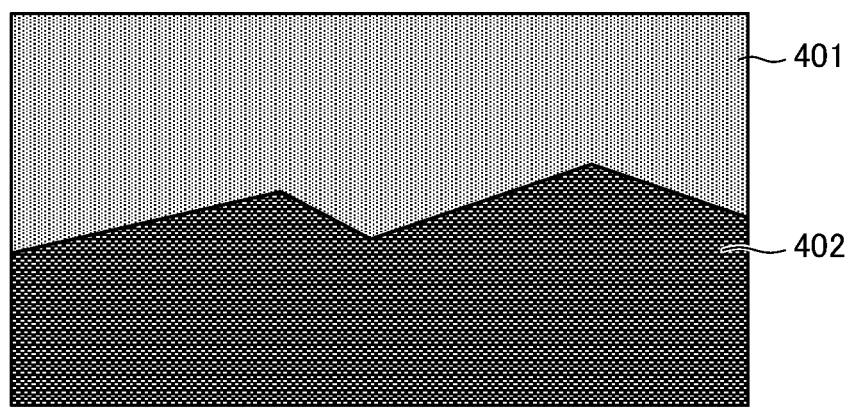
FIG. 4 is an explanatory view of a photographing scene.
Figure 5:
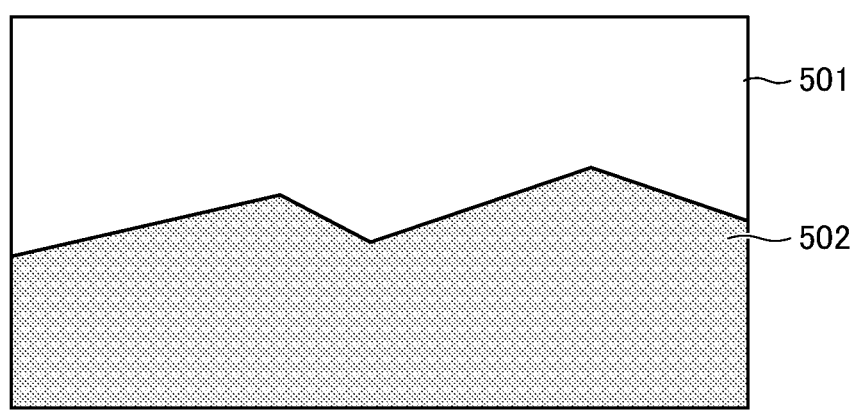
FIG. 5 is a view showing an example of a simulation image.
Figure 6:
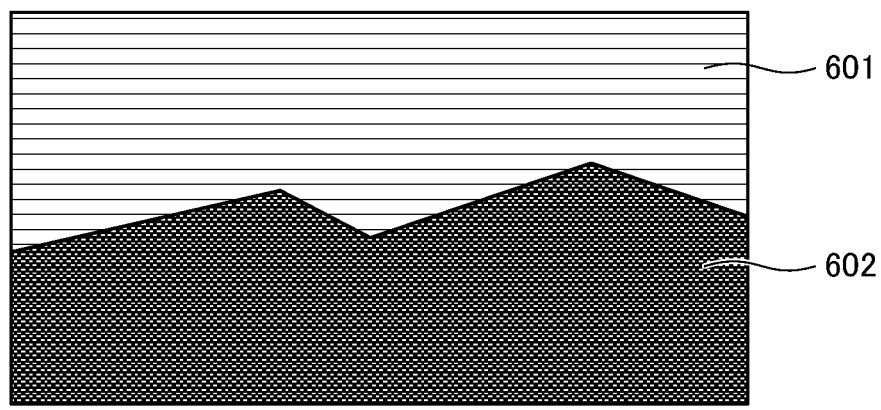
FIG. 6 is a view showing an example of a simulation image in which a halation region is emphasis-displayed.

In S308, the live view image generating unit 111 and the live view image display unit 112 perform warning display on the live view such that a halation region is emphasized. Here, an example of an image in which a halation region is emphasis-displayed will be described using FIGS. 4 to 6. FIG. 4 is an explanatory view of a photographing scene. FIG. 4 assumes a scene in which scenery of a mountain and the sky is photographed. A region 401 is a light region of the sky, and a region 402 is a region of a mountain darker than the region 401. If the scene of FIG. 4 is photographed in the additive composition mode, in each image before additive composition, there is no halation in either the region 401 or the region 402 as shown in FIG. 4. FIG. 5 is a view showing an example of a simulation image. FIG. 5 is an additively composite simulation image obtained by capturing a plurality of images of the scene in FIG. 4. A region 501 of the sky becomes halation through addition. However, although a region 502 of a mountain is brighter than the region 402 of a mountain, no halation has occurred. FIG. 6 is a view showing an example of a simulation image in which a halation region is emphasis-displayed. FIG. 6 is an example in which the halation region in FIG. 5 is emphasized and superimposition-displayed on the simulation image, it is made clear to a user that halation has occurred by emphasis-displaying a halation region 601 of the sky on the screen. For example, the halation region 601 of the sky is emphasis-displayed by superimposition-displaying a horizontal line on the halation region 601 of the sky. For example, in S307, the live view image generating unit 111 and the live view image display unit 112 retain information indicating whether each pixel of the simulation image is in halation, and the halation region is superimposition-displayed using the information. In addition, the method of emphasis-display need only allow a user to recognize the halation region. For example, emphasis-display can also be performed by superimposition-displaying oblique lines on the halation region or flickering the superimposition-display of the halation region. In S308, an image having the halation region shown in FIG. 6 emphasis-displayed therein is displayed. S309 to S314 are processing similar to S207 to S212 in First Embodiment.

As described above, according to Second Embodiment, a user can visually recognize which region halation will occur after additive composition, which will assist the user in setting of the exposure or in setting of the quantity of capturing images.

Third Embodiment

In Second Embodiment, an example in which a halation region is emphasis-displayed in S308 as shown in FIG. 6 has been described. In the present embodiment, an example in which an icon of warning is superimposition-displayed on a simulation image will be described.

Figure 7:
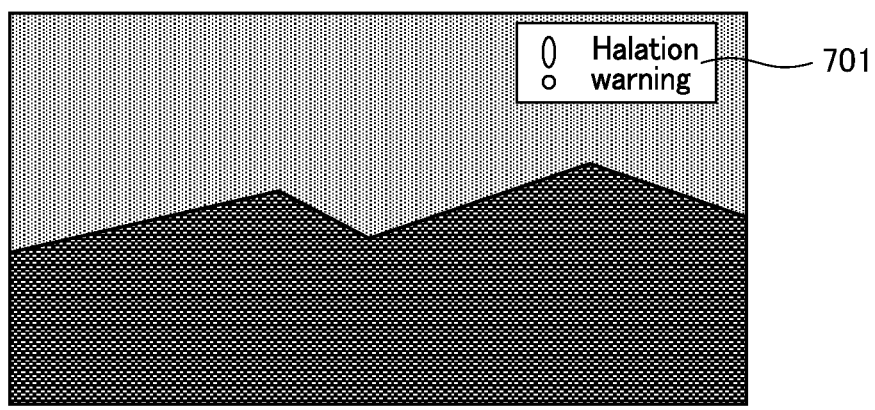
FIG. 7 is a view showing an example of a simulation image displaying a warning display icon.

In S308 according to the present embodiment, the live view image generating unit 111 and the live view image display unit 112 superimposition-display an icon of halation warning on live view. In the present embodiment, an example of the image displayed in S308 is shown in FIG. 7. FIG. 7 is a view showing an example of a simulation image displaying a warning display icon. Similar to Second Embodiment, in assumption of a scene as in FIG. 4, a simulation image in which halation occurs as in FIG. 5 can be obtained. In the present embodiment, a halation warning icon 701 is superimposition-displayed as in FIG. 7.

As described above, according to the present embodiment, a user can recognize whether halation occurs after additive composition by the icon, which will assist the user in setting of the exposure or in setting of the quantity of capturing images.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-193344, filed Dec. 2 2022, which is hereby incorporated by reference wherein in its entirety.

What is claimed is:

1. An image processing apparatus comprising:
   at least one processor and/or circuit configured to function as following units:
   an exposure setting unit configured to set an exposure of an image to be captured;
   a quantity setting unit configured to set a quantity of images to be captured;
   an image capturing unit configured to acquire a plurality of image signals corresponding to the set quantity by controlling image capturing at the set exposure;
   a composing unit configured to generate an additive composite image by additively composing the plurality of image signals;
   a generating unit configured to generate an image for live view; and
   a display control unit configured to control a display unit to display the image for live view,
   wherein the image for live view is an image displayed in real time before image capturing for acquiring the plurality of image signals is executed,
   wherein the generating unit generates simulation images corresponding to an exposure of the additive composite image as images for live view in accordance with the exposure and the quantity,
   wherein the generating unit generates an image captured at the exposure for live view set by the exposure setting unit as a normal live view image for live view,
   wherein the display control unit live-view displays either the normal live view image or the simulation image as the image for live view, and
   wherein the display control unit displays the normal live view image as the image for live view when a moving object is included in a subject and displays the simulation image as the image for live view when no moving object is included in a subject.

2. The image processing apparatus according to claim 1, wherein the display control unit switches display of the normal live view image and the simulation image in accordance with an instruction of a user.

3. The image processing apparatus according to claim 1, wherein the generating unit generates the simulation image by increasing a gain with respect to an image signal captured for live view.

4. The image processing apparatus according to claim 1, wherein the display control unit emphasis-displays a halation region of the simulation image.

5. The image processing apparatus according to claim 1, wherein the image signal is RAW data.

6. An image capturing apparatus comprising:
   an image capturing element;
   a display displaying a live view image; and
   at least one processor and/or circuit configured to function as following units:
   an exposure setting unit configured to set an exposure of an image to be captured,
   a quantity setting unit configured to set a quantity of images to be captured,
   an image capturing unit configured to acquire a plurality of image signals corresponding to the set quantity by controlling image capturing at the set exposure,
   a composing unit configured to generate an additive composite image by additively composing the plurality of image signals,
   a generating unit configured to generate an image for live view,
   a display control unit configured to control display unit to display the image for live view,
   wherein the image for live view is an image displayed in real time before image capturing for acquiring the plurality of image signals is executed,
   wherein the generating unit generates simulation images corresponding to an exposure of the additive composite image as images for live view in accordance with the exposure and the quantity,
   wherein the generating unit generates an image captured at the exposure for live view set by the exposure setting unit as a normal live view image for live view,
   wherein the display control unit live-view displays either the normal live view image or the simulation image as the image for live view, and
   wherein the display control unit displays the normal live view image as the image for live view when a moving object is included in a subject and displays the simulation image as the image for live view when no moving object is included in a subject.

7. A control method of an image processing apparatus, the method comprising:
   setting an exposure of an image to be captured;
   setting a quantity of images to be captured;
   acquiring a plurality of image signals corresponding to the set quantity by controlling image capturing at the set exposure;
   generating an additive composite image by additively composing the plurality of image signals;
   generating an image for live view; and
   controlling a display unit to display the image for live view,
   wherein the image for live view is an image displayed in real time before image capturing for acquiring the plurality of image signals is executed,
   wherein simulation images corresponding to an exposure of the additive composite image are generated as images for live view in accordance with the exposure and the quantity, wherein an image captured at the exposure set for live view are generated as a normal live view image for live view, wherein either the normal live view image or the simulation image is displayed in live-view as the image for live view, and wherein the normal live view image is displayed as the image for live view when a moving object is included in a subject and the simulation image is displayed as the image for live view when no moving object is included in a subject.

8. A non-transitory storage medium storing a control program of an image processing apparatus causing a computer to perform each step of a control method of the image processing apparatus, the method comprising:

setting an exposure of an image to be captured;

setting a quantity of images to be captured;

acquiring a plurality of image signals corresponding to the set quantity by controlling image capturing at the set exposure;

generating an additive composite image by additively composing the plurality of image signals;

generating an image for live view; and controlling a display unit to display the image for live view, wherein the image for live view is an image displayed in real time before image capturing for acquiring the plurality of image signals is executed, wherein simulation images corresponding to an exposure of the additive composite image are generated as images for live view in accordance with the exposure and the quantity, wherein an image captured at the exposure set for live view are generated as a normal live view image for live view, wherein either the normal live view image or the simulation image is displayed in live-view as the image for live view, and wherein the normal live view image is displayed as the image for live view when a moving object is included in a subject and the simulation image is displayed as the image for live view when no moving object is included in a subject.

9. An image processing apparatus comprising:

at least one processor and/or circuit configured to function as following units:

an exposure setting unit configured to set an exposure of an image to be captured;

a quantity setting unit configured to set a quantity of images to be captured;

an image capturing unit configured to acquire a plurality of image signals corresponding to the set quantity by controlling image capturing at the set exposure;

a composing unit configured to generate an additive composite image by additively composing the plurality of image signals;

a generating unit configured to generate an image for live view; and a display control unit configured to control a display unit to display the image for live view, wherein the image for live view is an image displayed in real time before image capturing for acquiring the plurality of image signals is executed, wherein the generating unit generates simulation images corresponding to an exposure of the additive composite image as images for live view in accordance with the exposure and the quantity, and wherein the display control unit emphasis-displays a halation region of the simulation image.

10. A control method of an image processing apparatus, the method comprising:

setting an exposure of an image to be captured;

setting a quantity of images to be captured;

acquiring a plurality of image signals corresponding to the set quantity by controlling image capturing at the set exposure;

generating an additive composite image by additively composing the plurality of image signals;

generating an image for live view; and controlling a display unit to display the image for live view, wherein the image for live view is an image displayed in real time before image capturing for acquiring the plurality of image signals is executed, wherein simulation images corresponding to an exposure of the additive composite image are generated as images for live view in accordance with the exposure and the quantity, and wherein a halation region of the simulation image is emphasis-displayed.

11. A non-transitory storage medium storing a control program of an image processing apparatus causing a computer to perform each step of a control method of the image processing apparatus, the method comprising:

setting an exposure of an image to be captured;

setting a quantity of images to be captured;

acquiring a plurality of image signals corresponding to the set quantity by controlling image capturing at the set exposure;

generating an additive composite image by additively composing the plurality of image signals;

generating an image for live view; and controlling a display unit to display the image for live view, wherein the image for live view is an image displayed in real time before image capturing for acquiring the plurality of image signals is executed, wherein simulation images corresponding to an exposure of the additive composite image are generated as images for live view in accordance with the exposure and the quantity, and wherein a halation region of the simulation image is emphasis-displayed.

* * * * *